(12) United States Patent
Baba

(10) Patent No.: US 10,431,088 B2
(45) Date of Patent: Oct. 1, 2019

(54) OBJECT DETECTION APPARATUS

(71) Applicant: DENSO CORPORATION, Kariya, Aichi-pref. (JP)

(72) Inventor: Takahiro Baba, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 102 days.

(21) Appl. No.: 15/513,717

(22) PCT Filed: Sep. 15, 2015

(86) PCT No.: PCT/JP2015/076132
§ 371 (c)(1),
(2) Date: Mar. 23, 2017

(87) PCT Pub. No.: WO2016/047498
PCT Pub. Date: Mar. 31, 2016

(65) Prior Publication Data
US 2017/0294124 A1 Oct. 12, 2017

(30) Foreign Application Priority Data
Sep. 24, 2014 (JP) .................................. 2014-193892

(51) Int. Cl.
*G08G 1/16* (2006.01)
*G01S 15/06* (2006.01)
(Continued)

(52) U.S. Cl.
CPC .............. *G08G 1/16* (2013.01); *G01S 13/867* (2013.01); *G01S 13/931* (2013.01); *G01S 15/06* (2013.01);
(Continued)

(58) Field of Classification Search
None
See application file for complete search history.

(56) References Cited

U.S. PATENT DOCUMENTS

| | | | | |
|---|---|---|---|---|
| 2001/0016797 A1* | 8/2001 | Ogura | ..................... | G06T 7/246 701/301 |
| 2003/0210807 A1* | 11/2003 | Sato | ................... | G06K 9/00805 382/104 |

(Continued)

*Primary Examiner* — Truc M Do
(74) *Attorney, Agent, or Firm* — Knobbe, Martens, Olson & Bear, LLP

(57) ABSTRACT

In an object detection apparatus, a first region definition unit defines a first object region including a first detection point representing a relative position of a first object detected based on detection information from the radar. A second region definition unit defines a second object region including a second detection point representing a relative position of a second object detected based on a captured image from a monocular camera. A learning status acquisition unit acquires a learning progress status to estimate a position of FOE on the captured image. If there is an overlap of the first and second object regions, a determination unit determines that these objects are the same object. The second region definition unit sets a length of the second object region in a depthwise or vehicle-lengthwise direction representing a direction of the second detection point with respect to the reference point depending on the learning progress status.

10 Claims, 12 Drawing Sheets

(51) Int. Cl.
  *G05D 1/02*   (2006.01)
  *G06K 9/00*   (2006.01)
  *G01S 13/86*  (2006.01)
  *G01S 13/93*  (2006.01)
  *G01S 15/42*  (2006.01)

(52) U.S. Cl.
  CPC ......... G05D 1/0238 (2013.01); G05D 1/0255 (2013.01); G06K 9/00805 (2013.01); *G01S 15/42* (2013.01); *G05D 2201/0213* (2013.01); *G06K 9/00798* (2013.01); *G08G 1/165* (2013.01); *G08G 1/166* (2013.01)

(56) References Cited

U.S. PATENT DOCUMENTS

| | | | | |
|---|---|---|---|---|
| 2004/0080449 | A1* | 4/2004 | Horibe | G01S 7/4026 342/70 |
| 2006/0274149 | A1* | 12/2006 | Yoshizawa | B60R 21/0134 348/148 |
| 2007/0055446 | A1* | 3/2007 | Schiffmann | G01S 7/4026 701/301 |
| 2008/0079954 | A1* | 4/2008 | Iwaki | G01C 3/08 356/614 |
| 2009/0135065 | A1* | 5/2009 | Tsuchida | G01S 13/931 342/454 |
| 2009/0252377 | A1* | 10/2009 | Akita | G06K 9/3241 382/106 |
| 2012/0133769 | A1* | 5/2012 | Nagamine | B60R 1/00 348/148 |
| 2013/0286205 | A1* | 10/2013 | Okada | H04N 7/18 348/148 |
| 2014/0037138 | A1* | 2/2014 | Sato | G08G 1/166 382/103 |
| 2014/0139369 | A1* | 5/2014 | Baba | G01S 13/867 342/146 |
| 2015/0054673 | A1* | 2/2015 | Baba | G01S 13/867 342/27 |

* cited by examiner

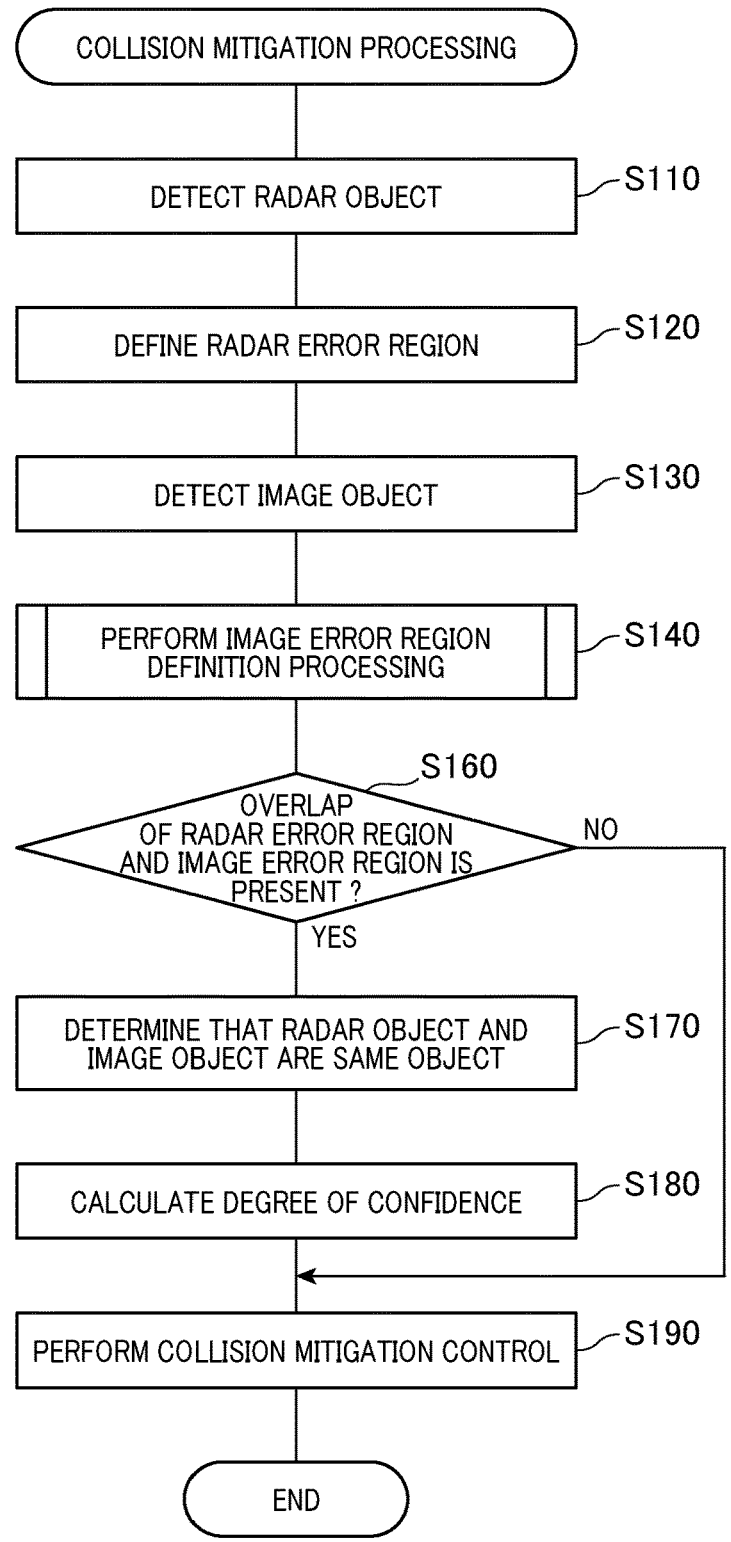

NORMAL CASE

EXAMPLE OF DISTRIBUTION FOR DOWNWARD DISPLACEMENT

EXAMPLE OF DISTRIBUTION FOR NO DISPLACEMENT

EXAMPLE OF DISTRIBUTION FOR UPWARD DISPLACEMENT

FOE DISPLACEMENT PORTION

LOWER END DISPLACEMENT PORTION + FOE DISPLACEMENT PORTION

OBJECT DETECTION APPARATUS

CROSS-REFERENCE TO RELATED APPLICATIONS

This application is based on and claims the benefit of priority from earlier Japanese Patent Application No. 2014-193892 filed Sep. 24, 2014, the description of which is incorporated herein by reference.

TECHNICAL FIELD

The present invention relates to techniques for detecting objects using a radar and a camera.

BACKGROUND ART

Vehicle collision avoidance systems are required to accurately detect objects, such as a vehicle other than an own vehicle that is a vehicle carrying the system and a pedestrian. For example, a vehicle collision avoidance system as disclosed in Patent Literature 1 is configured to detect objects using a radar and a camera. More specifically, the disclosed vehicle collision avoidance system uses a millimeter-wave radar and a stereoscopic camera separately, and if a positional relationship between an object detected by the millimeter-wave radar and an object detected by the stereoscopic camera meets a predetermined criteria, determines that these objects are the same object.

CITATION LIST

Patent Literature

[Patent Literature 1] JP-A-2014-122873

SUMMARY OF THE INVENTION

Technical Problem

However, in a situation where an object detected by the millimeter-wave radar and an object detected by the monocular camera are in proximity to each other, these objects may be mistakenly recognized as the same object even if they are different objects.

In consideration of the foregoing, exemplary embodiments of the present invention are directed to providing an object detection apparatus capable of accurately determining whether or not objects detected using a radar and a camera are the same object.

Solution to Problem

In accordance with an exemplary embodiment of the present invention, there is provided an object detection apparatus. In the apparatus, a first region definition unit is configured to define a first object region including a first detection point representing a relative position of the first object with respect to a reference point in an XY-plane with an X-axis direction of the XY-plane being a vehicle widthwise (or lateral) direction and a Y-axis direction of the XY-plane being a vehicle lengthwise (or longitudinal) direction, where the first object is an object detected based on detection information acquired from the millimeter-wave radar. A second region definition unit is configured to define a second object region including a second detection point representing a relative position of a second object with respect to the reference point in the XY-plane, where the second object is an object detected based on a captured image acquired from the monocular camera.

Further, in the apparatus, a learning status acquisition unit is configured to acquire a learning progress status to estimate a position of a focus of expansion (FOE) on the captured image. A determination unit is configured to, if there is an overlap of the first and second object regions in the XY-plane, determine that the first object and the second object are the same object. The second region definition unit is configured to set a length of the second object region in a depthwise or vehicle-lengthwise direction representing a direction of the second detection point of the second region with respect to the reference point depending on the learning progress status.

That is, in a configuration of the present invention, where the position of the object is detected from the captured image, magnitude of the depthwise or vehicle-lengthwise error varies depending on whether or not the position of the FOE is accurately recognized. Thus, in lo the present invention, the length of the second object region in the depthwise or vehicle-lengthwise (longitudinal) direction is configured to be set depending on the learning progress status to estimate the position of the FOE in the captured image.

The object detection apparatus configured as above can accurately determine objects detected using a radar and a camera are the same object. The above and other objects, features and advantages of the present invention will be readily apparent and fully understood from the following detailed description of preferred embodiments, taken in connection with the appended drawings.

BRIEF DESCRIPTION OF DRAWINGS

FIG. 2 is a flowchart of collision mitigation processing to be performed in the collision mitigation ECU;

DESCRIPTION OF EMBODIMENTS

Embodiments of the present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

(Configuration)

An collision mitigation apparatus 1 in accordance with one embodiment of the present invention is an apparatus mounted in a vehicle (hereinafter referred to as an own vehicle), such as a passenger car, and configured to detect an object (that is an object, such as a vehicle other than the own vehicle or a pedestrian) using a radar and a camera image, and in cases where the own vehicle is likely to collide with the object, perform control operations, such as braking the own vehicle, to avoid the collision or mitigate the impact of any possible collision between the object and the own vehicle.

Figure 1A:
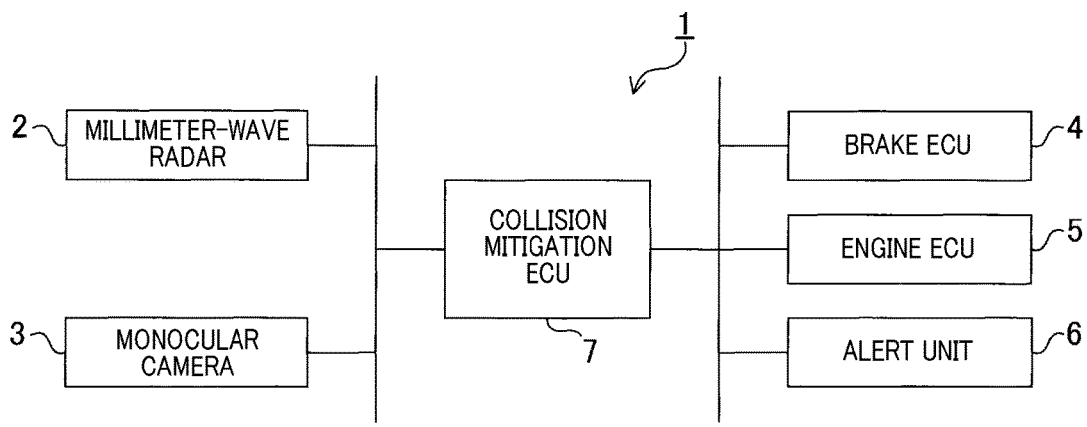
FIG. 1A is a block diagram of a collision mitigation apparatus in accordance with one embodiment of the present invention.

The collision mitigation apparatus 1, as shown in FIG. 1A, includes a millimeter-wave radar 2, a monocular camera 3, a brake electronic control unit (ECU) 4, an engine ECU 5, an alert unit 6, and a collision mitigation ECU 7. In the collision mitigation apparatus 1, for example, the collision mitigation ECU 7 is communicably connected to the millimeter-wave radar 2, the monocular camera 3, the brake ECU 4, the engine ECU 5, and the alert unit 6. Configurations to implement the communications are not particularly limited.

The millimeter-wave radar 2 is mounted in the front center (leading edge) of the own vehicle to detect objects, such as other vehicles and pedestrians, by using millimeter waves. The millimeter-wave radar 2 transmits millimeter waves forward from the own vehicle while scanning in a horizontal plane and receives millimeter waves reflected back to thereby transmit transmitted and received data in the form of radar signals to the collision mitigation ECU 7.

The monocular camera 3 includes a charge-coupled device (CCD) camera, and is mounted in the front middle portion of the own vehicle. The monocular camera 3 transmits data of captured images in the form of image signals to the collision mitigation ECU 7.

The brake ECU 4 includes CPU, ROM, RAM, and others to control braking of the own vehicle. More specifically, the brake ECU 4 controls a brake actuator (brake ACT) in response to a detection value outputted from a sensor to detect a brake pedal depression amount, where the brake actuator serves as an actuator that opens and closes a pressure increasing control valve and a pressure reducing control valve provided in a brake hydraulic circuit. The brake ECU 4 controls the brake actuator following instructions from the collision mitigation ECU 7 so as to increase a braking force of the own vehicle.

The engine ECU 5 includes CPU, ROM, RAM, and others to control engine start/shutdown, a fuel injection amount, the ignition time, and others. More specifically, the engine ECU 5 controls a throttle actuator (throttle ACT) in response to a detection value outputted from a sensor to detect an accelerator pedal depression amount, where the throttle actuator serves as an actuator that opens and closes a throttle valve provided in an air intake conduit. The engine ECU 5 controls the throttle actuator following instructions from the collision mitigation ECU 7 so as to decrease a driving force of the internal-combustion engine.

The alert unit 6, upon reception of a warning signal from the collision mitigation ECU 7, acoustically and optically alerts a driver of the own vehicle.

The collision mitigation ECU 7 includes CPU, ROM, RAM, and others to integrally control the collision mitigation apparatus 1. The collision mitigation ECU 7 acquires radar signals from the millimeter-wave radar 2 and image signals from the monocular camera 3 every predetermined time interval based on a master clock.

(Processing)

There will now be described object detection and collision mitigation processing to be performed in the collision mitigation apparatus 1. An object detection program, i.e., a program for the collision mitigation apparatus 1 to implement the object detection and collision mitigation processing, is stored in the collision mitigation ECU 7. This collision mitigation processing to be performed by the collision mitigation ECU 7 executing the program will be described with reference to FIG. 2. FIG. 2 illustrates a flowchart of the processing to be performed in the collision mitigation ECU 7 every predetermined time interval.

First, in the collision mitigation processing, as shown in FIG. 2, the collision mitigation ECU 7 detects an object based on a radar signal transmitted from the millimeter-wave radar 2 (i.e., detection information from the millimeter-wave radar 2) (step S110). More specifically, based on the radar signal, the collision mitigation ECU 7 calculates (or determines) a linear distance from the own vehicle to the object and a horizontal azimuth angle of the object (i.e., an angular position of the object from the direction ahead of the own vehicle).

Figure 3:
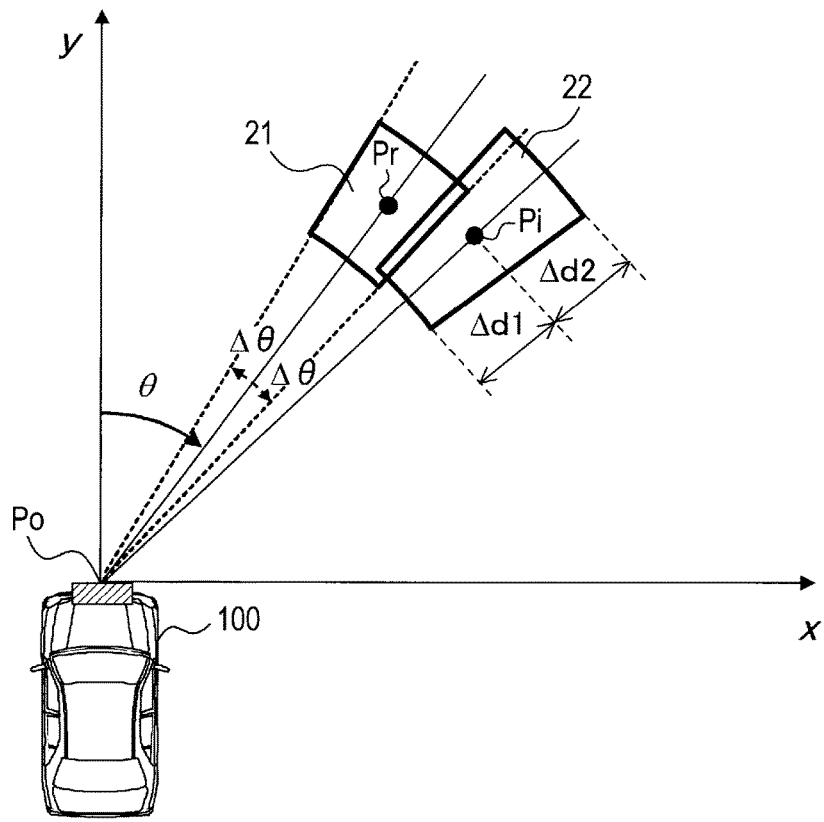
FIG. 3 is a plan view of error regions.

Based on these calculated values, the collision mitigation ECU 7, as shown in FIG. 3, calculates or determines position coordinates (X- and Y-coordinates) of the object in the XY-plane as a detection point Pr of the object in the XY-plane. The X-axis of the XY-plane represents a vehicle-widthwise direction (transverse direction) of the own vehicle, and the Y-axis of the XY-plane represents a vehicle-lengthwise direction of the own vehicle (i.e., the direction ahead of the own vehicle). The detection point Pr of an object having a plurality of detection points detected by the millimeter-wave radar 2 in an object-widthwise direction is set in the middle of the plurality of detection points.

A reference point Po of the XY-plane is set at a nose (or front end) of the own vehicle, on which the millimeter-wave radar 2 is mounted. The detection point Pr is a relative position of the object with respect to the reference point Po. FIG. 3 illustrates an example of an object located ahead of and to the right of the own vehicle. Additionally, in step S110, the collision mitigation ECU 7 may calculate, in addition to the detection point Pr of the object, a relative speed and the like of the object with respect to the own vehicle. In the following, the object detected in step S110

(the object detected based on the detection information from the millimeter-wave radar 2) will be referred to as a "radar object."

Subsequently, as shown in FIG. 3, the collision mitigation ECU 7 defines a radar error region 21 centered at the detection point Pr calculated in step S110 (step S120). More specifically, the radar error region 21 has a two-dimensional extension (specified by Δθ) centered at the detection point Pr, where an extension of the radar error region 21 in the X-axis direction represents a range of assumed error around the X-coordinate of the detection point Pr and an extension of the radar error region 21 in the Y-axis direction represents a range of assumed error around the Y- coordinate of the detection point Pr. These ranges of assumed error are predetermined based on the characteristics of the millimeter-wave radar 2.

Subsequently, the collision mitigation ECU 7 detects an object based on an image signal transmitted from the monocular camera 3 (i.e., a captured image from the monocular camera 3) (step S130). More specifically, the collision mitigation ECU 7 applies image analysis to the captured image represented by the image signal to identify an object. This identification may be implemented by matching processing using prestored object models.

An object model is prepared for each object type, such as a vehicle, a pedestrian, or the like, which allows not only determination of the presence of an object, but also identification of its object type. The collision mitigation ECU 7 determines a Y-coordinate of the object in the XY-plane based on a vertical position of the object in the captured image, and a horizontal azimuth angle of the object (an angular position from the direction ahead of the own vehicle) based on a horizontal position of the object in the capture image.

As the object is located more distant from the own vehicle in the direction ahead of the own vehicle, that is, as the Y-coordinate of the object is increased, a lower end of the object tends to be located at a higher position in the captured image. This allows the Y-coordinate of the object to be determined based on the lower end position of the object in the captured image. In such a specific manner, however, inaccurate detection of the lower end position of the object will leads to lower accuracy in detecting the Y-coordinate of the object.

In addition, a horizontal displacement of the object from the focus of expansion (FOE) of the monocular camera 3 tends to increase with an increasing angular displacement (inclination) of the object from the direction ahead of the own vehicle (specifically, a line of X=0). This allows a horizontal azimuth angle of the object to be determined based on a distance from the FOE to a vertical line passing through the center of the object.

As such, in step S130, the collision mitigation ECU 7 determines the Y-coordinate and the horizontal azimuth angle (angular position) of the object in the XY-plane as the detection point Pi of the object in the XY-plane, as shown in FIG. 3. The detection point Pi of the object is set, for example, in the center in the object's width direction. The detection point Pi of the object represents a relative position of the object with respect to the reference point Po. In the following, the object detected in step S130 (the object detected based on the captured image from the monocular camera 3) will be referred to as an "image object."

Subsequently, as shown in FIG. 3, in region definition processing, the collision mitigation ECU 7 defines an image error region 22 centered at the detection point Pi of the image object calculated in step S130 (step S140). More specifically, the image error region 22 has a two-dimensional extension around the detection point Pi, where an extension of the error region 22 in a depthwise direction that is a direction in which Pi is looked from Po (or in the Y-axis direction) represents a range of assumed error around a coordinate of the detection point Pi in the depthwise direction (or around the Y-coordinate of the detection point Pi) and an extension of the error region 22 in the horizontal azimuth angle direction represents a range of assumed error around the horizontal azimuth angle of the detection point Pi. These ranges of assumed error are predetermined based on the characteristics of the monocular camera 3.

Figure 4:
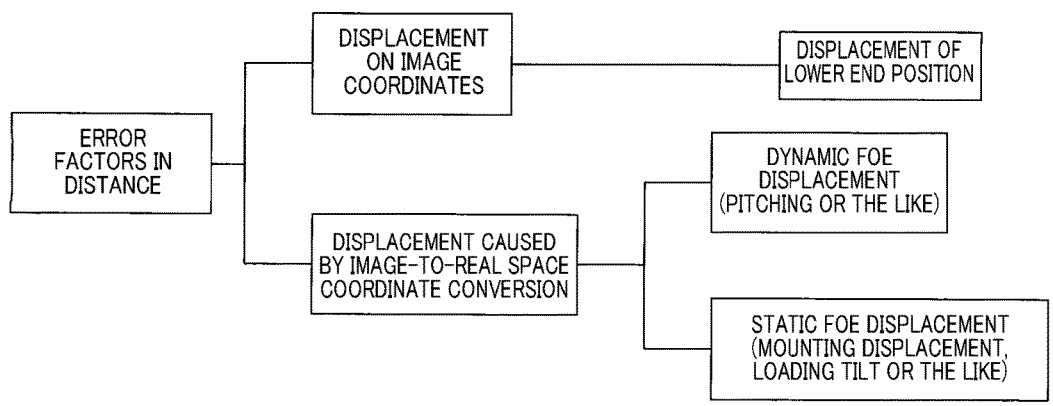
FIG. 4 illustrates distance error factors in detecting an object in an image.

In this processing, the extension of the error region 22 in horizontal azimuth is set to a predetermined value, and the extension of the error region 22 in the depthwise direction is changed or altered depending on situations. As shown in FIG. 4, there are error factors in detecting the position of the image object from the captured image.

Error factors may include displacement of a lower end position of the object (errors in the position of the lower end of the object). The displacement of the lower end position refers to an error between a correct position of the lower end of the object and a position of the lower end of the object mistakenly detected in the event where edge points (where a difference in brightness value between adjacent pixels is equal to or greater than a predetermined value) cannot be correctly detected.

Figure 5:
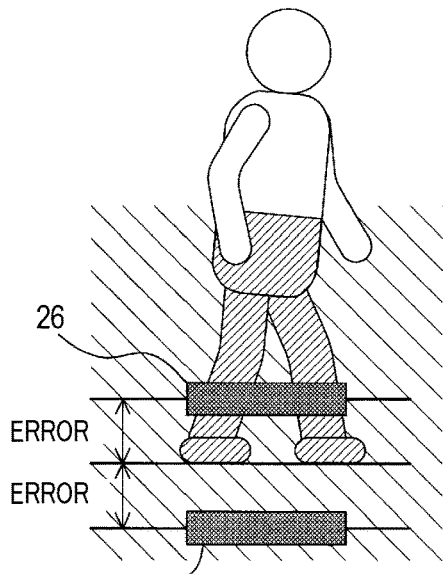
FIG. 5 illustrates errors caused by displacement of a lower end position.

For example, as shown in FIG. 5, if a lower end position 26 of the object is detected above a correct lower end position of the object in the captured image, the position of the object will be recognized as being error-in-position further from the own vehicle than the correct lower end position of the object. If a lower end position 27 of the object is detected below the correct lower end position of the object in the captured image, the position of the object will be recognized as being error-in-position closer to the own vehicle than the correct lower end position of the object.

The error factors may include displacement of the position of the FOE in the captured image. The displacement of the position of the FOE may include dynamic FOE displacement caused by pitching (swaying motion of the own vehicle in the fore-aft direction) or the like and static FOE displacement caused by mounting displacement (misalignment) of the monocular camera 3 or the loading tilt representing the tilt of the whole vehicle due to the weight of baggage.

Figure 6:
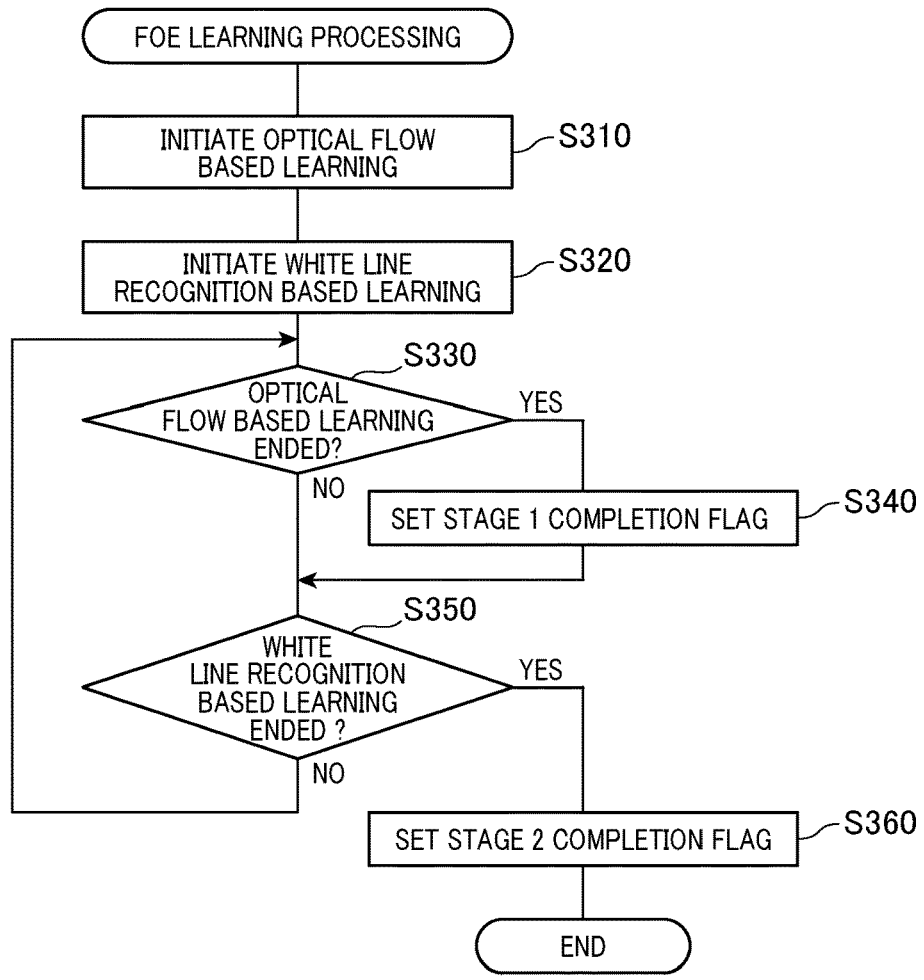
FIG. 6 is a flowchart of FOE learning processing to be performed in the collision mitigation ECU.

This static FOE displacement can be calculated by the collision mitigation ECU 7 performing FOE learning processing as shown in FIG. 6 lo that is performed separately from collision mitigation processing. In the FOE learning processing, as shown in FIG. 6, the collision mitigation ECU 7 initiates the FOE learning via optical flows (step S310).

Figure 7:
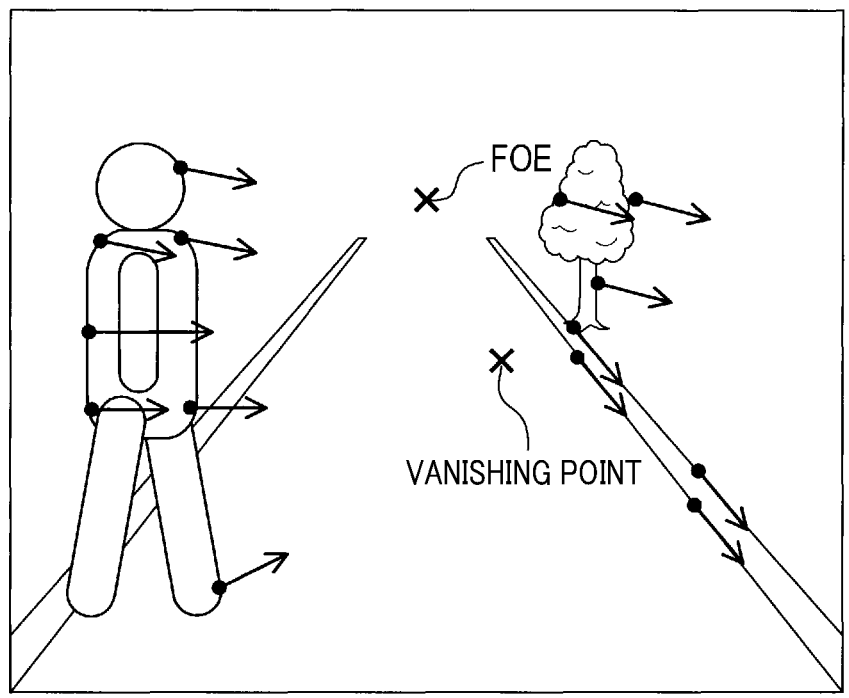
FIG. 7 is a pictorial diagram illustrating optical flows.

As shown in FIG. 7, the collision mitigation ECU 7 sets a large number of feature points at the edge points in the captured image, and acquires, for each of these feature points, a vector representing how the feature point time-sequentially moves. That is, the collision mitigation ECU 7 calculates the optical flows, and using the optical flows, acquires the position of the FOE.

For example, a stationary object, such as a white line or a tree, is detected such that optical flows of the stationary object move in the captured image as if it had emerged from the FOE. In addition, a moving object that is laterally moving in the captured image, such as a crossing pedestrian, a crossing bicycle or the like, is detected as if it were moving toward a vanishing point other than the FOE. That is, the position of the FOE can be known by acquiring the point from which the object emerges. Processing to detect the position of the FOE using the optical flows may be accomplished by image processing a few frames of captured image. It is, therefore, possible to estimate the position of the FOE in a relatively short time.

Subsequently, the collision mitigation ECU 7 initiates learning of the position of the FOE via white line recognition (step S320). In step S320, the collision mitigation ECU 7 recognizes white lines on left and right sides of the own vehicle in the captured image, as shown in FIG. 7, and estimates the position of the FOE by calculating an intersection point of extensions of these white lines. Such calculation of the position of the FOE based on positons of the white lines enables accurate calculation of the position of the FOE, but may take a longer time to estimate the position of the FOE because calculation of the position of the FOE requires a situation that the own vehicle is traveling on a non-undulating and straight road and there exist white lines on both left and right sides of the own vehicle.

The collision mitigation ECU 7 determines whether or not the learning of the position of the FOE via optical flows has been completed (step S330). If it is determined that the learning of the position of the FOE via optical flows has been completed (step S330; YES), then the collision mitigation ECU 7 stores the position of the FOE in a memory, such as the RAM, and sets a flag in the memory indicating completion of learning stage 1 (step S340). Thereafter, the process flow proceeds to step S350.

If it is determined that the learning of the position of the FOE via optical flows has not been completed yet (step S330; NO), then the collision mitigation ECU 7 determines whether or not the learning of the position of the FOE via white line recognition has been completed (step S350). If it is determined that the learning of the position of the FOE via white line recognition has not been completed yet (step S350; NO), then in the collision mitigation ECU 7, the process flow returns to step S330.

If it is determined that the learning of the position of the FOE via white line recognition has been completed (step S330; YES), then the collision mitigation ECU 7 stores the position of the FOE in the memory, such as the RAM, and sets a flag in the memory indicating completion of learning phase 2 (step S360). Thereafter, the process flow of the FOE learning ends. The FOE learning processing is performed every predetermined time interval or at any timing, whereby the position of the FOE is stored in the memory.

A difference between the position of the FOE acquired in such a manner as above and a predetermined reference position is recognized as the "static FOE displacement".

Figure 8:
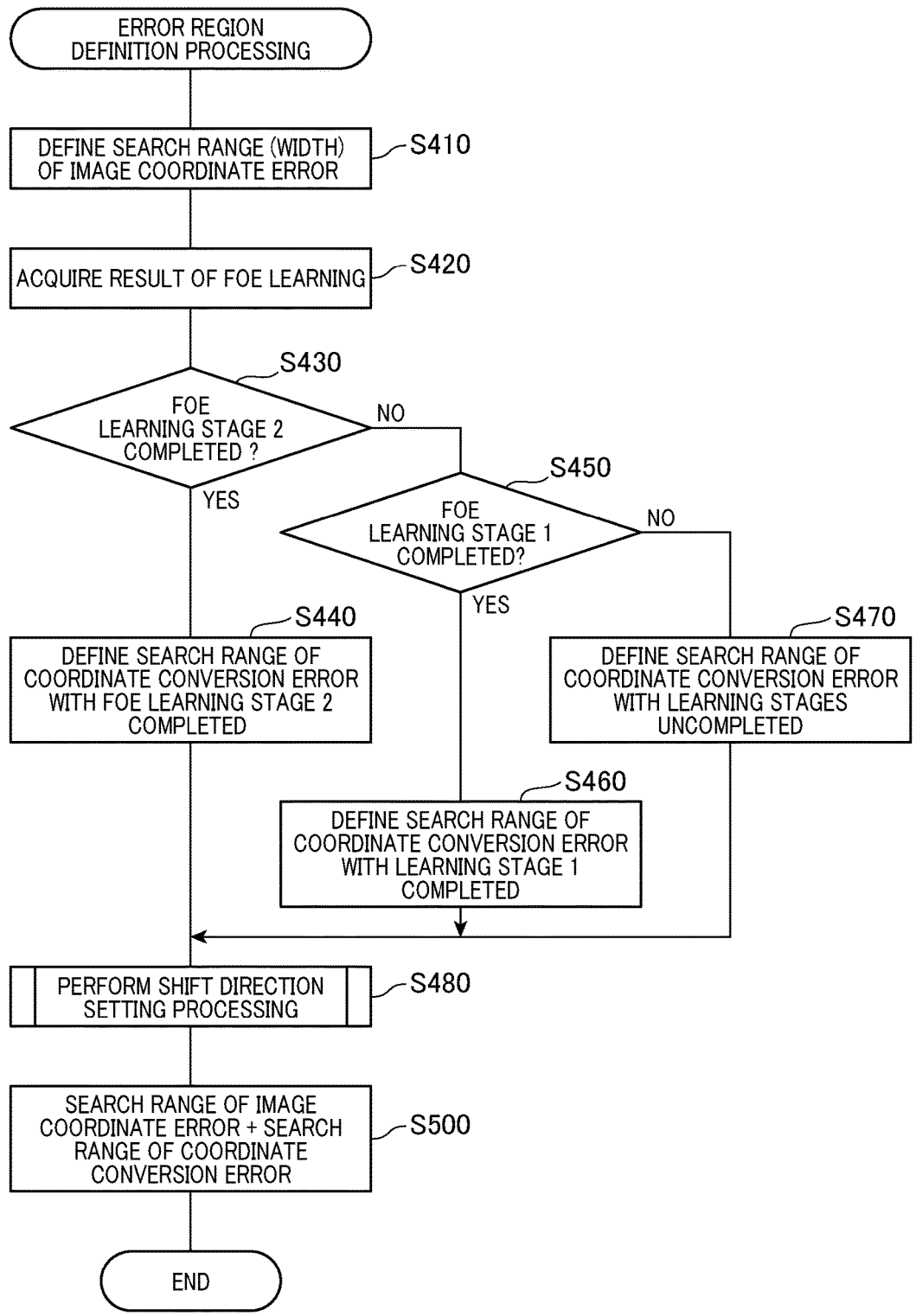
FIG. 8 is a flowchart of region definition processing included in the collision mitigation processing.

In image object region definition processing of S140 shown in FIG. 2, a depthwise dimension (or length) of the image error region 22 is set based on a value acquired by summing these error factors. That is, in the image object region definition processing, as shown in FIG. 8, the collision mitigation ECU 7, first, sets a search range of image coordinate error in the widthwise (azimuthal) direction (step S410).

In step S410, as in the millimeter-wave radar 2, an extension of the image error region 22 in the widthwise (azimuthal) direction represents a predetermined range of assumed error. Subsequently, the collision mitigation ECU 7 acquires a result of the FOE learning (step S420). In step S420, the collision mitigation ECU 7 acquires the position of the FOE stored in the memory, and values of flags (i.e., the flag indicating the completion of the learning stage 1 and the flag indicating the completion of the learning stage 2) (step S430).

Based on the values of the flags, the collision mitigation ECU 7 determines whether or not the FOE learning stage 2 has been completed (step S430) and then determines whether or not the FOE learning stage 1 has been completed (step S450). If the learning stage 2 has been completed (step S430; YES), the collision mitigation ECU 7 sets a search range of coordinate conversion error with the learning stage 2 completed (step S440).

If only the learning stage 1 has been completed (step S430; NO and step S450; YES), the collision mitigation ECU 7 sets a search range of coordinate conversion error with the learning stage 1 completed (step S460). If none of the learning stages 1 and 2 have been completed (step S430; NO and step S450; NO), the collision mitigation ECU 7 sets a search range of coordinate conversion error with the FOE learning uncompleted (step S470).

The positional error of the FOE ("static FOE displacement") takes a minimum value when the learning stage 2 has been completed. The positional error of the FOE takes a higher value when only the learning stage 1 has been completed than when the learning stage 2 has been completed. The positional error of the FOE takes an even higher value when the learning stages are uncompleted. Thus, the search range of coordinate conversion error is set smallest when the learning stage 2 has been completed. The search range of coordinate conversion error is set larger when only the learning stage 1 has been completed than when the learning stage 2 has been completed. The search range of coordinate conversion error is set even larger when the learning stages are uncompleted.

Figure 9:
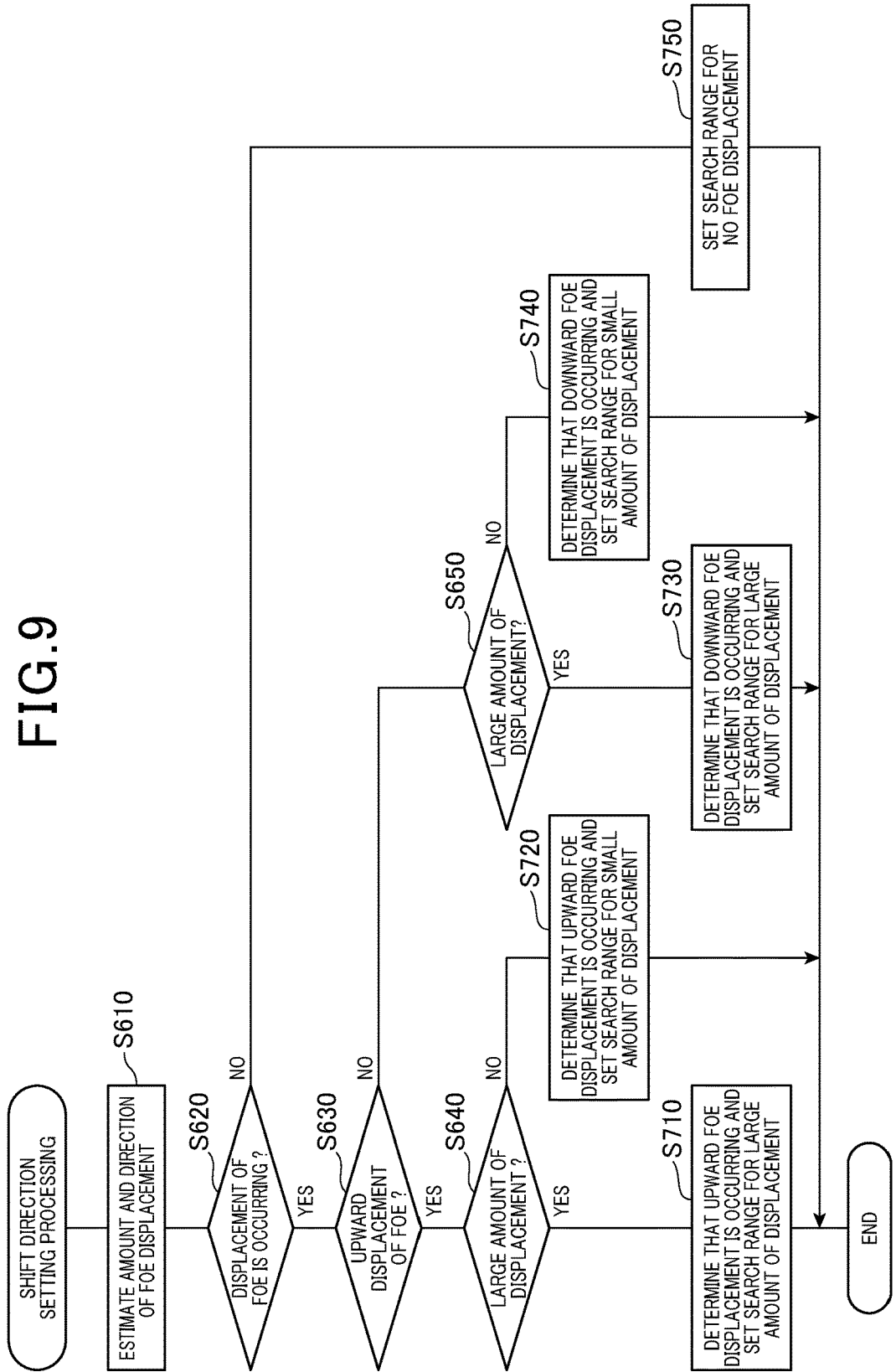
FIG. 9 is a flowchart of shift direction setting processing included in the region definition processing.

Subsequently, the collision mitigation ECU 7 performs shift direction setting processing (step S480). In the shift direction setting processing, the position of the search range is shifted depending on a direction of the FOE displacement with respect to the reference. Specifically, as shown in FIG. 9, the collision mitigation ECU 7 estimates an amount and a direction of the FOE displacement (step S610).

In step S610, vertical FOE displacement in the captured image are taken into account. The position of the FOE stored in the memory allows an amount of displacement of the FOE with respect to the reference to be calculated.

Figure 10:
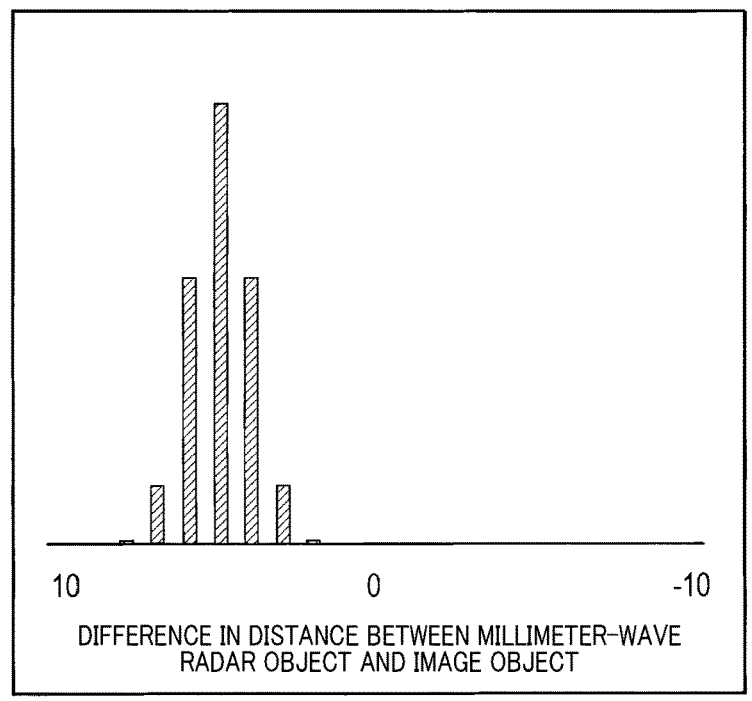
FIG. 10 is a graph illustrating a distribution of differences in position between an image object and a radar object when downward displacement of the FOE is occurring.
Figure 11:
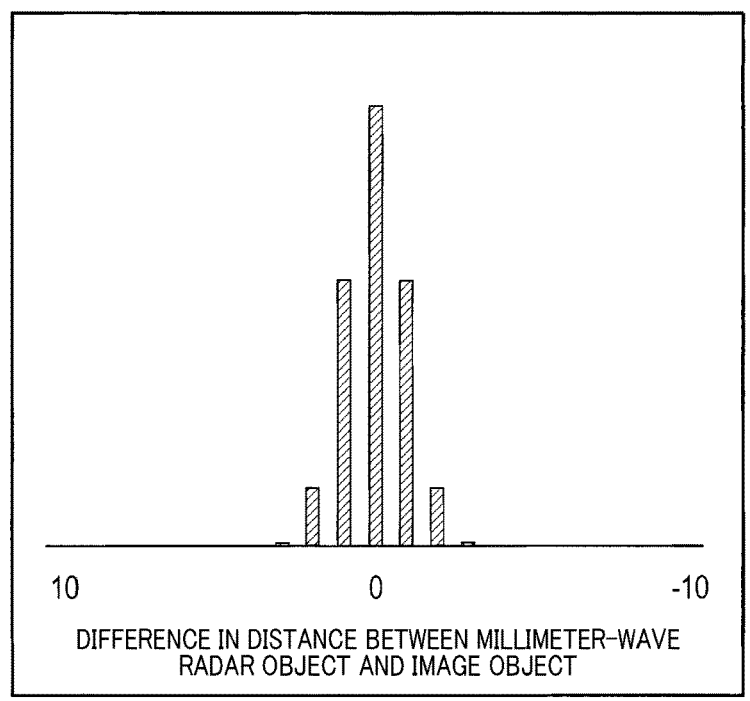
FIG. 11 is a graph illustrating a distribution of differences in position between an image object and a radar object when no displacement of the FOE is occurring.
Figure 12:
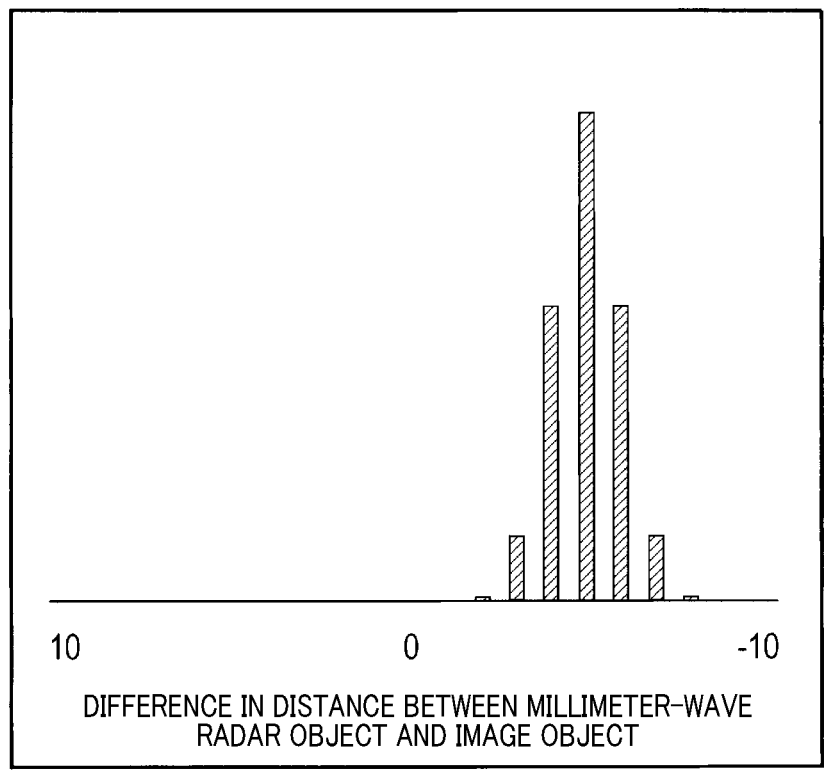
FIG. 12 is a graph illustrating a distribution of differences in position between an image object and a radar object when upward displacement of the FOE is occurring.

The amount of displacement of the FOE with respect to the reference can be represented by distributions as shown in FIGS. 10-12. In FIGS. 10-12, given an object positioned at a certain distance from the own vehicle, the abscissa axis denotes a difference in distance between the radar object and the image object, and the ordinate axis denotes the number of detections of the object.

For example, when the FOE is displaced downward with respect to the reference, the image object is detected closer to the own vehicle than the radar object, as shown in FIG. 10. When the FOE is not substantially displaced with respect to the reference, the radar object and the image object are detected at substantially the same distance from the own vehicle, as shown in FIG. 11. When the FOE is displaced upward with respect to the reference, the image object is detected more distant from the own vehicle than the radar object, as shown in FIG. 12.

Subsequently, the collision mitigation ECU 7 determines whether or not displacement of the FOE is occurring (step S620). If no displacement of the FOE is occurring (step S620; NO), the collision mitigation ECU 7 sets a search range for no displacement of the FOE (step S750).

That is, as shown in FIG. 3, a depthwise length of the image error region 22 defined around the image object Pi is given by a sum of a depthwise length $\Delta d1$ of a near side of the image error region with respect to the image object Pi and a depthwise length Δd2 of a far side of the image error region with respect to the image object Pi, where the depthwise length Δd1 is equal to the depthwise length Δd2. It should be noted that FIG. 3 illustrates Δd1 and Δd2 of the image error region 22 acquired as a final result of step S500.

If displacement of the FOE is occurring (step S620; YES), the collision mitigation ECU 7 determines whether the FOE is displaced upward or downward. If the FOE is displaced upward (step S630; YES), then the collision mitigation ECU 7 compares an amount of displacement of the FOE and a predetermined displacement threshold (step S640).

Figure 13:
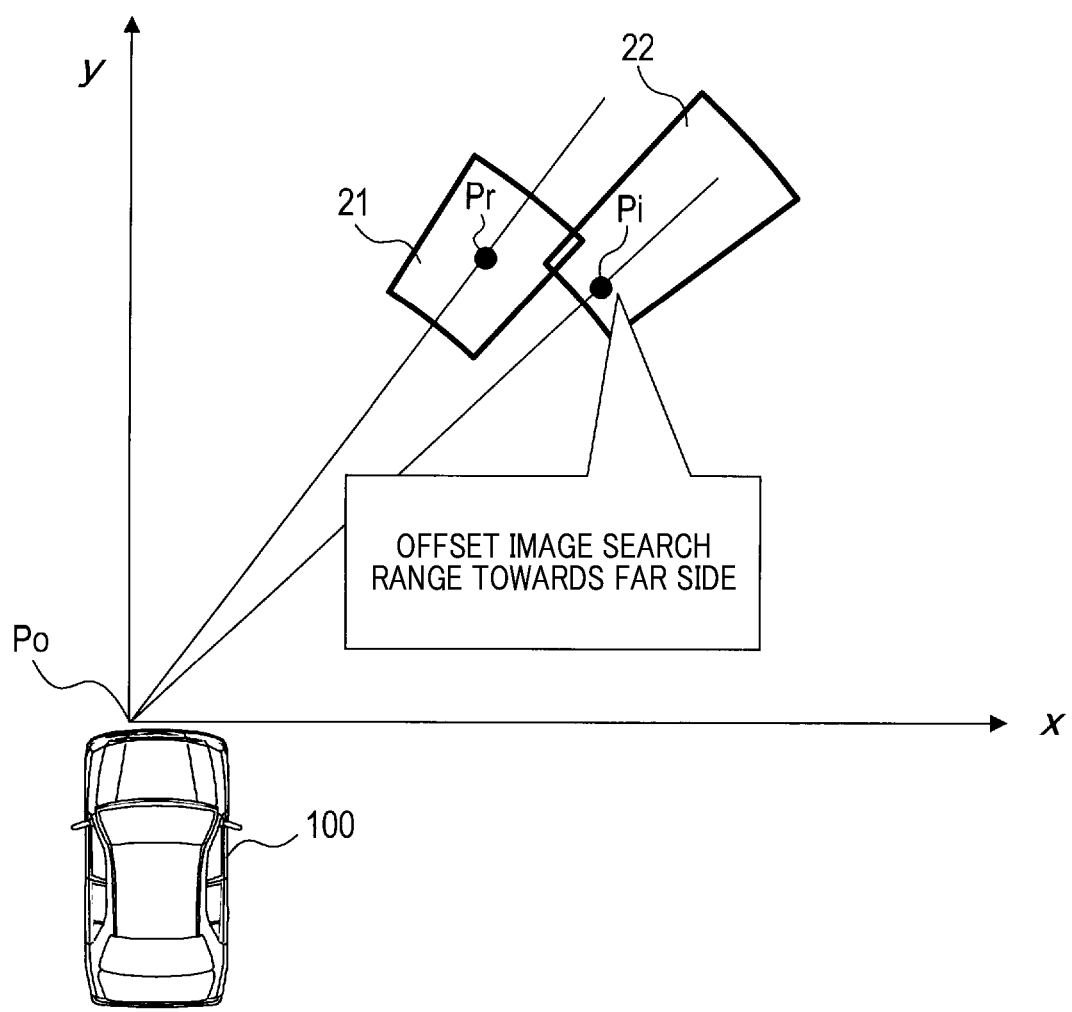
FIG. 13 is a plan view illustrating an example of defining an image error region when upward displacement of the FOE is occurring.

If the amount of displacement of the FOE is equal to or greater than the displacement threshold (step S640; YES), then the collision mitigation ECU 7 determines that upward displacement of the FOE is occurring, and then sets a search range for a large amount of displacement of the FOE (step S710). In step S710, as shown in FIG. 13, the collision mitigation ECU 7 shifts (or offsets) the image error region 22 towards the far side with respect to the image object Pi (so that the image error region 22 is shifted further away from the own vehicle in the depthwise direction). As a result, the depthwise length Δd1 of the near side of the image error region with respect to the image object Pi will be set less than the depthwise length Δd2 of the far side of the image error region with respect to the image object Pi.

If upward displacement of the FOE is occurring and if the radar object and the image object are the same object, the radar object is more likely to be detected further away from the own vehicle than the image object in the depthwise direction. Therefore, the far side of the image error region with respect to the image object Pi will have a larger area than the near side of the image error region with respect to the image object Pi.

If the amount of displacement of the FOE is less than the displacement threshold (step S640; NO), then the collision mitigation ECU 7 determines that downward displacement of the FOE is occurring and then sets a search range for a small amount of displacement of the FOE (step S720). Also in step S720, as shown in FIG. 13, the collision mitigation ECU 7 shifts the image error region 22 towards the far side with respect to the image object Pi, where an amount of shift is less than an amount of shift for the search range for the large amount of displacement of the FOE.

In step S630, if downward displacement of the FOE is occurring (step S630; NO), then the collision mitigation ECU 7, as in step S640, compares an amount of downward displacement of the FOE and a predetermined displacement threshold (step S650).

Figure 14:
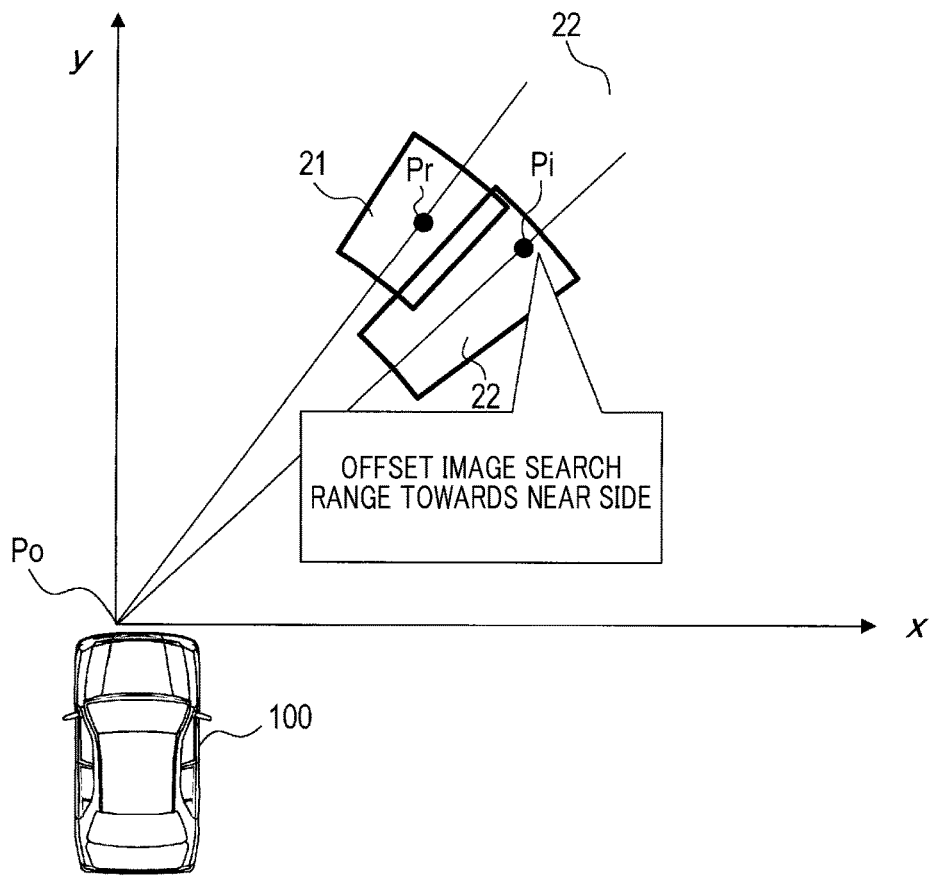
FIG. 14 is a plan view illustrating an example of defining an image error region when downward displacement of the FOE is occurring.

If the amount of displacement of the FOE is equal to or greater than the displacement threshold (step S650; YES), then the collision mitigation ECU 7 determines that downward displacement of the FOE is occurring and sets a search range for a large amount of displacement of the FOE (step S730). In step S730, as shown in FIG. 14, the collision mitigation ECU 7 shifts the image error region 22 towards the near-side with respect to the image object Pi (so that the image error region 22 approaches the own vehicle). As a result, the depthwise length Δd1 of the near side of the image error region with respect to the image object Pi will be set greater than the depthwise length Δd2 of the far side of the image error region with respect to the image object Pi.

That is, if downward displacement of the FOE is occurring and if the radar object and the image object are the same object, the radar object is more likely to be detected closer to the own vehicle than the image object. Therefore, the near side of the image error region with respect to the image object Pi will have a larger area than the far side of the image error region with respect to the image object Pi.

If the amount of displacement of the FOE is less than the displacement threshold (step S650; NO), then the collision mitigation ECU 7 determines that downward displacement of the FOE is occurring and sets a search range for a small amount of displacement of the FOE (step S740). Also in step S740, as shown in FIG. 14, the collision mitigation ECU 7 shifts the image error region 22 towards the near-side with respect to the image object Pi, where an amount of shift is less than an amount of shift for the search range for the large amount of downward displacement of the FOE.

Thereafter, the shift direction setting processing ends. Referring back to FIG. 8, the collision mitigation ECU 7 sets the depthwise length of the image error region 22 to a sum of the search range of image coordinate error and the search range of coordinate conversion error (step S500).

Figure 15:
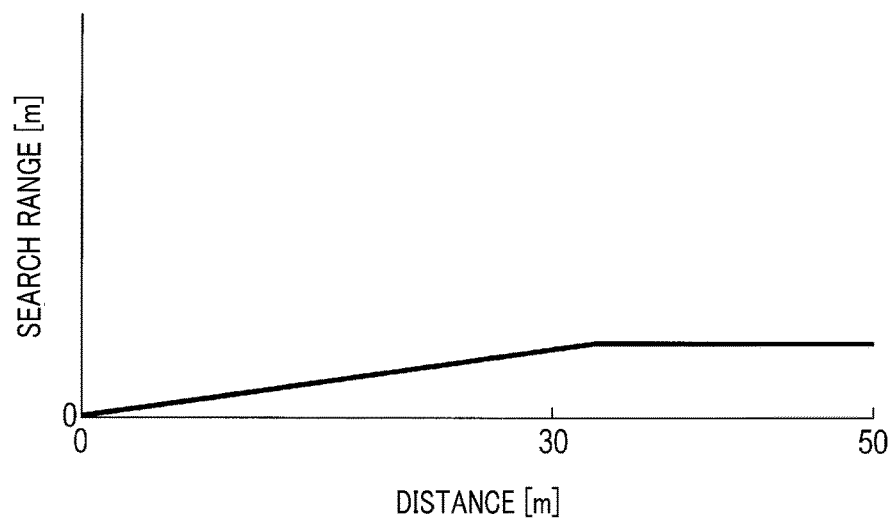
FIG. 15 is a graph illustrating an example of setting a search range based on displacement of a lower end of an object.

The image coordinate error corresponds to displacement of the lower end position of the object. As the distance to the object increases, the search range corresponding to the displacement of the lower end of the object is increased. As shown in FIG. 15, the search range corresponding to the displacement of the lower end of the object is gradually increased with increasing distance to the object up to about 30 m. For the distance to the object above about 30 m, the search range corresponding to the displacement of the lower end of the object is set constant.

Figure 16:
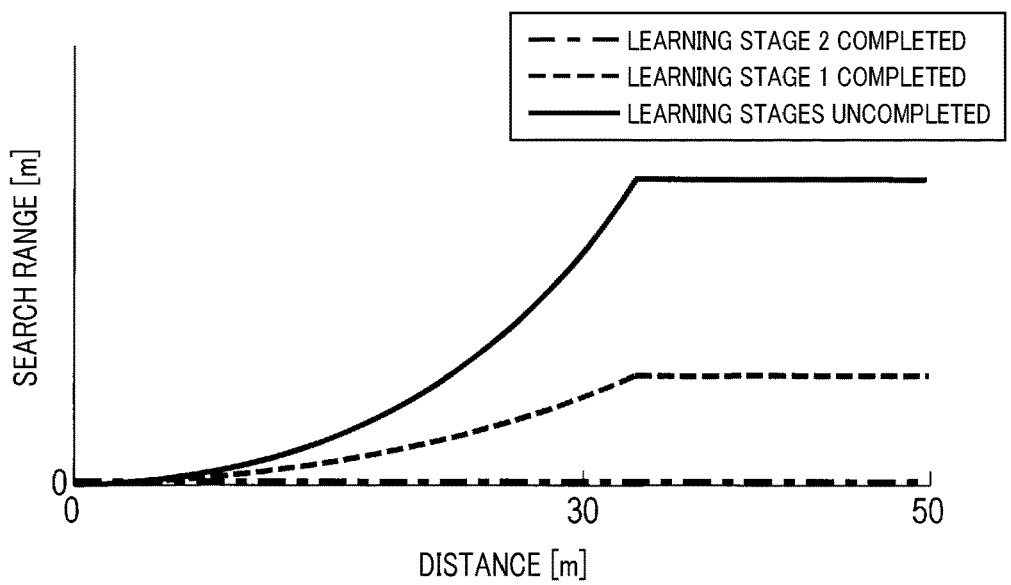
FIG. 16 is a graph illustrating an example of setting a search range based on displacement of the FOE.

The coordinate conversion error corresponds to displacement of the position of the FOE. As the distance to the object increases, the search range corresponding to the displacement of the FOE is increased. In addition, the search range corresponding to the displacement of the position of the FOE is increased with increasing amount of displacement of the position of the FOE. As shown in FIG. 16, the search range corresponding to the displacement of the position of the FOE is gradually increased with increasing distance to the object up to about 30 m. For the distance to the object above about 30 m, the search range corresponding to the displacement of the FOE is set constant.

Figure 17:
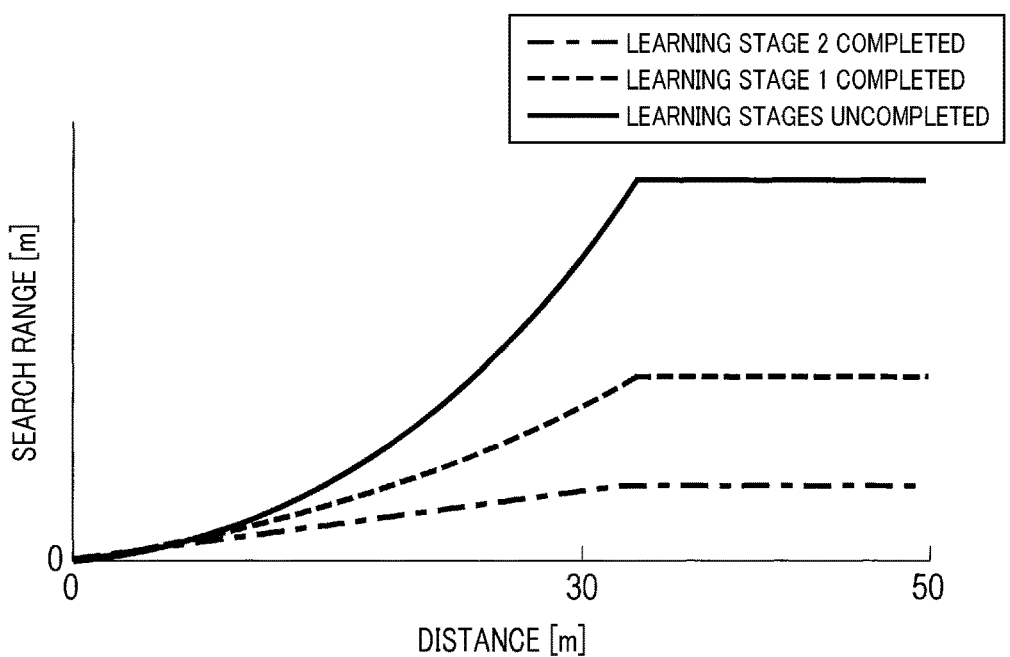
FIG. 17 is a graph illustrating an example of summing the search range based on the lower end displacement and the search range based on the FOE displacement.

As shown in FIG. 17, the sum of search ranges shown in FIGS. 15 and 16 is set as the depthwise direction (Δd1+Δd2) of the image error region 22. The depthwise direction of the image error region 22 is to be multiplied by a multiplying factor (or a coefficient) depending on the learning status.

For example, if the search range of coordinate conversion error with the learning stage 2 completed is set in step S440, the multiplying factor is set to a minimum value (for example, 0.8). Multiplying the sum of search ranges by the multiplying factor finally provides a depthwise direction of the image error region 22.

For example, if the search range of coordinate conversion error with the learning stages uncompleted is set in step S470, the multiplying factor is set to a maximum value (for example, 1.2). If the search range of coordinate conversion error with the learning stage 2 completed is set in step S460, the multiplying factor is set to an intermediate value (for example, 1.0).

As the position of the FOE is more accurately determined depending on the learning status, the image error region 22 is defined to have a smaller area.

Thereafter, the image object region definition processing ends. Subsequently, returning to FIG. 2, the collision mitigation ECU 7 determines whether or not there is an overlap of the radar error region 21 and the image error region 22 in the XY-plane (step S160).

If it is determined that there is an overlap of the radar error region 21 and the image error region 22 (step S160; YES), then the collision mitigation ECU 7 determines that the radar object and the image object are the same object (step S170). In this case, a position of the object determined to be the same object in the XY-plane is specified by the Y-coordinate of the detection point Pr of the radar object and the horizontal azimuth angle of the image object.

Subsequently, the collision mitigation ECU 7 calculates a degree of confidence in determination that the radar object and the image object are the same object (step S180). In the present embodiment, the degree of confidence is defined by an angle difference between the horizontal azimuth angle of the detection point Pr of the radar object and the horizontal azimuth angle of the detection point Pi of the image object. Such a degree of confidence increases with decreasing angle difference.

If it is determined in step S160 that there exists no overlap of the radar error region 21 and the image error region 22 (step S160; NO), then the collision mitigation ECU 7 determines that the radar object and the image object are not the same, that is, they are different objects. Then, the process flow proceeds to step S190.

Subsequently, the collision mitigation ECU 7 performs collision mitigation control based on the position of the detected object and the degree of confidence (step S190). For example, if the own vehicle is likely to collide with the object, the collision mitigation ECU 7 transmits a warning signal to an alert unit 6 to alert the driver. If the own vehicle is more likely to collide with the object, the collision mitigation ECU 7 instructs the engine ECU 5 to decrease a driving force of an internal-combustion engine and/or instructs the brake ECU 4 to increase a braking force of the own vehicle.

In addition, the collision mitigation ECU 7 changes control aspects depending on the degree of confidence. For example, for a high degree of confidence, a control initiation timing is advanced as compared to a control initiation timing for a low degree of confidence.

Figure 1B:
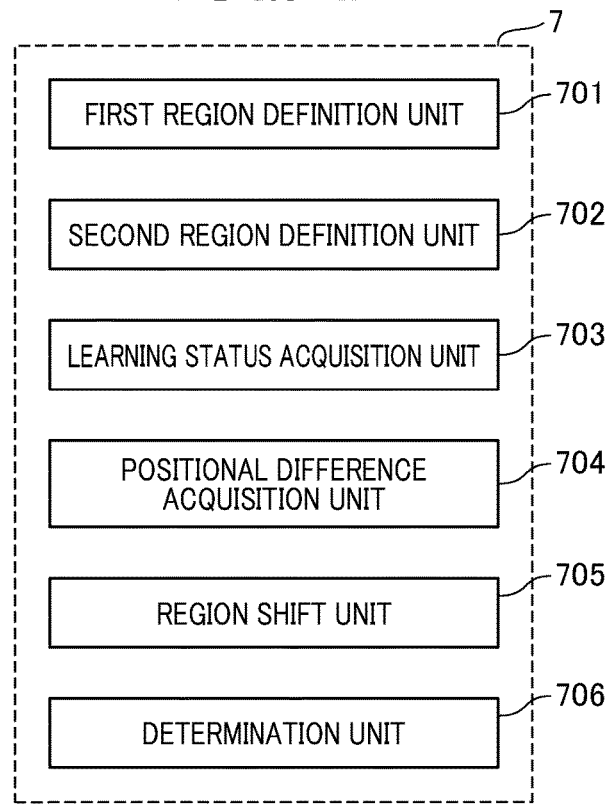
FIG. 1B is a functional block diagram of a collision mitigation ECU.

In the present embodiment, the collision mitigation ECU 7 corresponds to an object detection apparatus of the present invention. FIG. 1B illustrates a functional block diagram of the collision mitigation ECU 7. Various implementations of these blocks described herein can be realized in processor, in software, or in any combination thereof. The collision mitigation ECU 7 includes, as functional blocks, a first region definition unit 701, a second region definition unit 702, a learning status acquisition unit 703, a positional difference acquisition unit 704, a region shift unit 705, and a determination unit 706. The first region definition unit 701 performs steps S110, S120. The second region definition unit 702 performs step S130, S140, and steps S430-S500. The learning status acquisition unit 703 performs step S420. The positional difference acquisition unit 704 performs step S610. The region shift unit 705 performs steps S620-S750. The determination unit 706 performs step S160.

(Advantages)

In the collision mitigation apparatus 1 of the present invention, the collision mitigation ECU 7 defines a first object region including a first detection point representing a relative position of a first object with respect to a reference point in an XY-plane with an X-axis direction of the XY-plane being a vehicle widthwise (or lateral) direction and a Y-axis direction of the XY-plane being a vehicle lengthwise (or longitudinal) direction, where the first object is an object detected based on detection information acquired from the millimeter-wave radar 2. The collision mitigation ECU 7 defines a second object region including a second detection point representing a relative position of a second object with respect to the reference point in the XY-plane, where the second object is an object detected based on a captured image acquired from the monocular camera 3.

The collision mitigation ECU 7 acquires a learning progress status to estimate a position of the FOE on the captured image, and if there is an overlap of the first and second object regions in the XY-plane, determines that the first object and the second object are the same object. To define the second object region, the collision mitigation ECU 7 sets a length of the second object region in a depthwise or vehicle-lengthwise (longitudinal) direction representing a direction of the second detection point of the second region with respect to the reference point depending on the learning progress status.

That is, in such a configuration of the present invention, where the position of the object is detected from the captured image, magnitude of the depthwise or vehicle-lengthwise error varies depending on whether or not the position of the FOE is accurately recognized. Thus, in the present invention, the length of the second object region in the depthwise or vehicle-lengthwise (longitudinal) direction is configured to be set depending on the learning progress status to estimate the position of the FOE in the captured image.

The object detection apparatus configured as above can accurately determine whether or not objects detected using a radar and a camera separately are the same object.

In the collision mitigation apparatus 1 of the present invention, the collision mitigation ECU 7 sets a sum of a value set based on the learning progress status and a value based on an estimated detection error in the position of the second object, as the depthwise or longitudinal length of the second object region.

That is, an error in the position of the object in the captured image can be decomposed into an error in the position of the FOE and an error in determining edges in the captured image representing the position of the object. Therefore, these constituent errors are separately calculated and then these constituent errors are summed up.

In such a configuration of the collision mitigation apparatus 1, the value set based on the learning progress status and the value based on the estimated detection error in the position of the second object can be separately calculated, which allows the depthwise or longitudinal length of the second object region to be set properly.

On the captured image, a distance per pixel increases with increasing distance to the second object. In the collision mitigation apparatus 1 of the present invention, therefore, the collision mitigation ECU 7 increases the depthwise or longitudinal length of the second object region as the distance to the second object increases.

With such a configuration of the collision mitigation apparatus 1, the second object region can be defined more properly.

In the collision mitigation apparatus 1, the collision mitigation ECU 7 acquires a difference of the position of the FOE from a predetermined reference position on the captured image, and shifts the position of the second region in the XY-plane depending on the difference of the position of the FOE from the predetermined reference position.

With such a configuration of the collision mitigation apparatus 1, in which direction errors are more likely to occur can be estimated based on the difference of the position of the FOE from the predetermined reference position, and the second object region can be shifted in the estimated direction. Thus, the second object region can be set properly, which enables accurate determination as to whether or not objects detected using a camera and a radar separately are the same object.

In the collision mitigation apparatus 1 configured as above, the collision mitigation ECU 7 acquires a vertical difference of the position of the FOE from the reference position on the captured image. If upward displacement of the FOE from the reference position is occurring, the collision mitigation ECU 7 shifts the second object region towards the far side with respect to the second detection point as viewed from the reference point or in the Y direction of the XY-plane. If downward displacement of the FOE from the reference position is occurring, the collision mitigation ECU 7 shifts the second object region towards the near side with respect to the second detection point as viewed from the reference point or in the -Y direction of the XY-plane.

With such a configuration of the collision mitigation apparatus 1, the position of the second object region can be shifted to reflect the displacement of the FOE properly.

Other Embodiments

The present invention is not in any way limited to the above embodiment. Reference numerals and signs used in the above description of the embodiment are appropriately used in the claims as well. The reference numerals and signs are used for easy understanding of the present invention, and should not be construed as limiting the technical scope of the present invention. The functions of a single component may be distributed to a plurality of components, or the functions of a plurality of components may be integrated into a single component. At least part of the configuration of the above embodiments may be replaced with a known configuration having a similar function. At least part of the configuration of the above embodiments may be removed. At least part of the configuration of one of the above embodiments may be replaced with or added to the configuration of another one of the above embodiments. While only certain features of the invention have been illustrated and described herein, many modifications and changes will occur to those skilled in the art. It is, therefore, to be understood that the appended claims are intended to cover all such modifications and changes as falling within the true spirit of the invention.

It should be appreciated that the invention is not to be limited to the collision mitigation apparatus 1 disclosed above and that the present invention can be implemented in numerous ways, including as a system that includes the collision mitigation apparatus 1 as a component, a program for enabling a computer to function as the collision mitigation apparatus 1, a storage medium storing such a program, a collision mitigation method and the like.

For example, in the collision mitigation apparatus 1 configured as above, the collision mitigation ECU 7 may acquire a vertical difference of the position of the FOE from the reference position on the captured image. If upward displacement of the FOE from the reference position is occurring, the collision mitigation ECU 7 may shift the second object region in the Y direction of the XY-plane as viewed from the reference point, and if downward displacement of the FOE from the reference position is occurring, the collision mitigation ECU 7 may shift the second object region in the -Y direction of the XY-plane as viewed from the reference point.

Also with such a configuration of the collision mitigation apparatus 1, the position of the second object region can be shifted so as to reflect the displacement of the FOE properly.

The invention claimed is:

1. An object detection apparatus mounted in a vehicle, comprising:
a first region definition unit configured to define, using a processor, a first object region including a first detection point representing a relative position of the first object with respect to a reference point in an XY-plane with an X-axis direction of the XY-plane being a vehicle widthwise (or lateral) direction and a Y-axis direction of the XY-plane being a vehicle lengthwise (or longitudinal) direction, where the first object is an object detected based on detection information acquired from a millimeter-wave radar;
a second region definition unit configured to define, using the processor, a second object region including a second detection point representing a relative position of a second object with respect to the reference point in the XY-plane, where the second object is an object detected based on a captured image acquired from a monocular camera;
a learning status acquisition unit configured to acquire, using the processor, a learning progress status to estimate a position of a focus of expansion (FOE) on the captured image;
a determination unit configured to, if there is an overlap of the first and second object regions in the XY-plane, determine, using the processor, that the first object and the second object are the same object,
wherein the second region definition unit is configured to set a length of the second object region in a depthwise or vehicle-lengthwise direction representing a direction of the second detection point of the second region with respect to the reference point depending on the learning progress status.

2. The apparatus according to claim 1, wherein the second region definition unit is configured to set a sum of a value set based on the learning progress status and a value based on an estimated detection error in the position of the second object, as the depthwise or vehicle-lengthwise length of the second object region.

3. The apparatus according to claim 1, wherein the second region definition unit is configured to increase the depthwise or vehicle-lengthwise length of the second object region as a distance to the second object increases.

4. The apparatus according to claim 1, further comprising:
a positional difference acquisition unit configured to acquire, using the processor, a difference of the position of the FOE from a predetermined reference position on the captured image; and
a region shift unit configured to shift the position of the second region in the XY-plane depending on the difference of the position of the FOE from the predetermined reference position.

5. The apparatus according to claim 4, wherein
the positional difference acquisition unit is configured to acquire a vertical difference of the position of the FOE from the reference position on the captured image, and
the region shift unit is configured to, if upward displacement of the FOE from the reference position is occurring, shift the second object region towards a far side with respect to the second detection point as viewed from the reference point or in a Y direction of the XY-plane, and if downward displacement of the FOE from the reference position is occurring, shift the second object region towards a near side with respect to the second detection point as viewed from the reference point or in a -Y direction of the XY-plane.

6. A method for performing object detection apparatus by a vehicle, comprising:

defining a first object region including a first detection point representing a relative position of the first object with respect to a reference point in an XY-plane with an X-axis direction of the XY-plane being a vehicle widthwise (or lateral) direction and a Y-axis direction of the XY-plane being a vehicle lengthwise (or longitudinal) direction, where the first object is an object detected based on detection information acquired from a millimeter-wave radar;

defining a second object region including a second detection point representing a relative position of a second object with respect to the reference point in the XY-plane, where the second object is an object detected based on a captured image acquired from a monocular camera;

acquiring a learning progress status to estimate a position of a focus of expansion (FOE) on the captured image;

determining, if there is an overlap of the first and second object regions in the XY-plane, that the first object and the second object are the same object, setting a length of the second object region in a depthwise or vehicle-lengthwise direction representing a direction of the second detection point of the second region with respect to the reference point depending on the learning progress status.

7. The method according to claim 6, further comprising:
setting a sum of a value set based on the learning progress status and a value based on an estimated detection error in the position of the second object, as the depthwise or vehicle-lengthwise length of the second object region.

8. The method according to claim 6, further comprising:
increasing the depthwise or vehicle-lengthwise length of the second object region as a distance to the second object increases.

9. The method according to claim 6, further comprising:
acquiring a difference of the position of the FOE from a predetermined reference position on the captured image; and shifting the position of the second region in the XY-plane depending on the difference of the position of the FOE from the predetermined reference position.

10. The method according to claim 9, further comprising:
acquiring a vertical difference of the position of the FOE from the reference position on the captured image, and shifting, if upward displacement of the FOE from the reference position is occurring, the second object region towards a far side with respect to the second detection point as viewed from the reference point or in a Y direction of the XY-plane, and if downward displacement of the FOE from the reference position is occurring, shift the second object region towards a near side with respect to the second detection point as viewed from the reference point or in a -Y direction of the XY-plane.

* * * * *